United States Patent Office 3,794,711
Patented Feb. 26, 1974

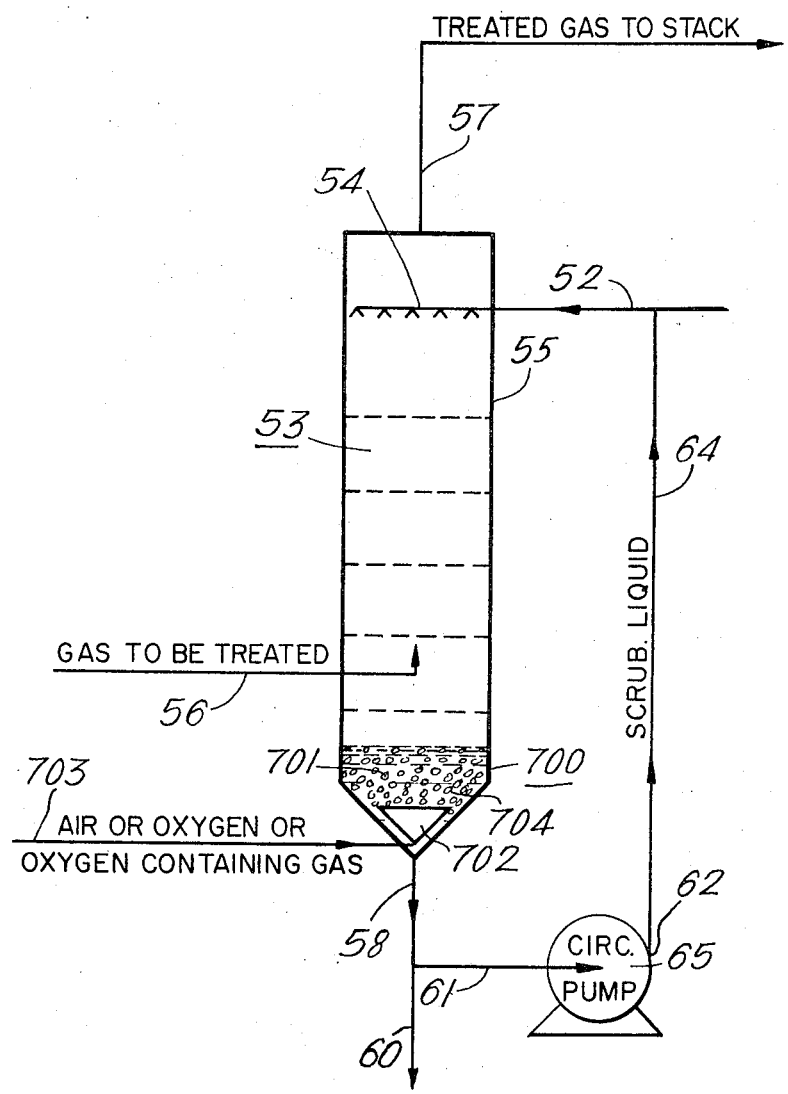

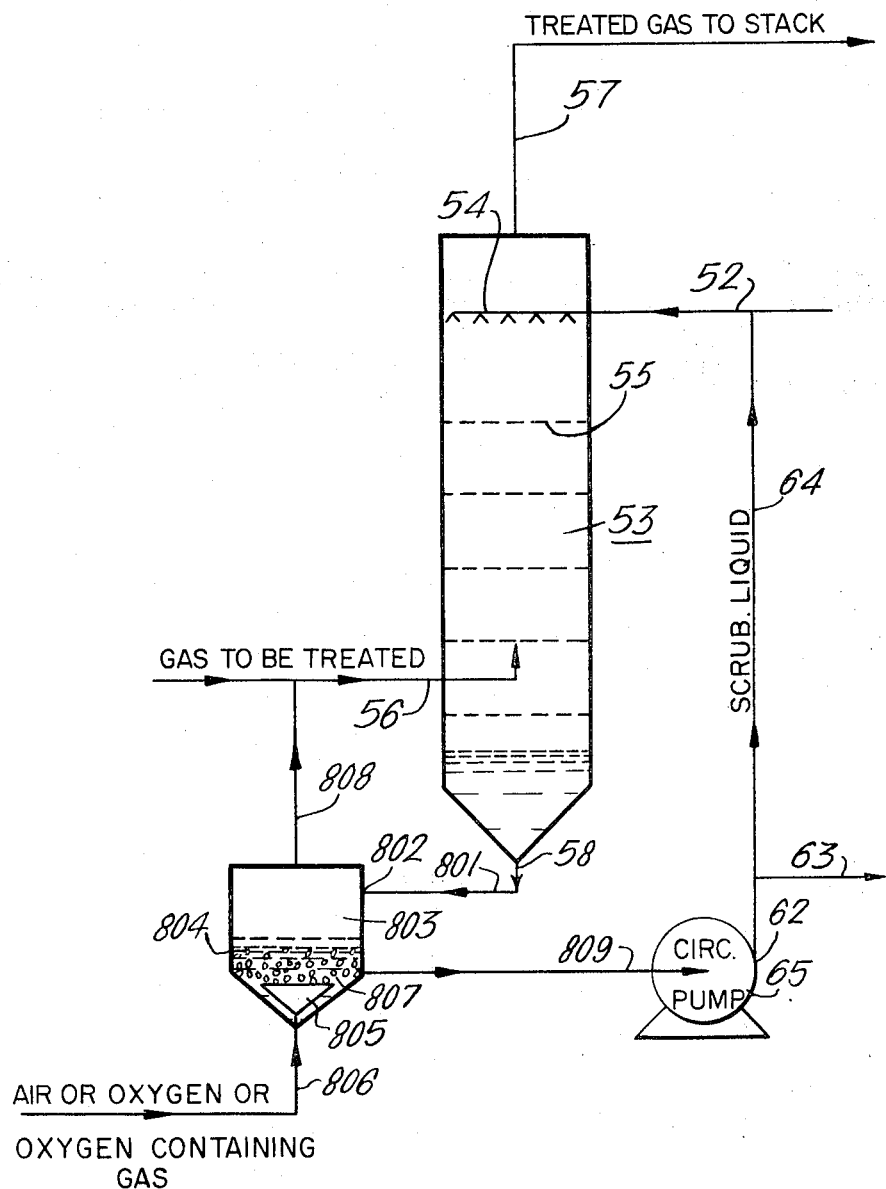

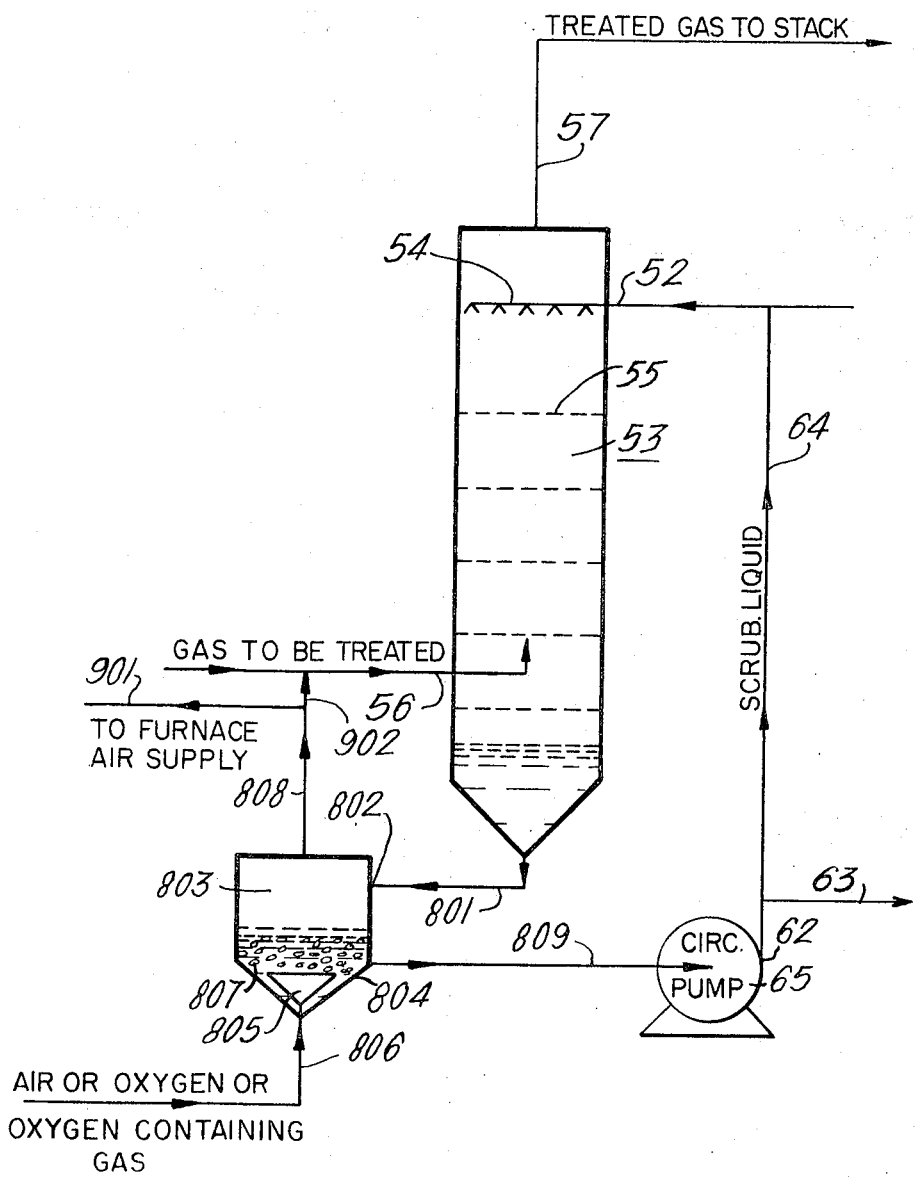

3,794,711
USE OF PHENOLIC COMPOUNDS FOR THE SIMULTANEOUS ABSORPTION AND OXIDATION OF OBJECTIONABLY ODORIFEROUS SULPHUR COMPOUNDS FROM A GASEOUS STREAM
Staya P. Bhatia, Pointe Claire, Steven Prahacs, Beaconsfield, Thomas L. de Souza, Lachine, and Herbert G. Jones, Beaconsfield, Quebec, Canada, assignors to Pulp and Paper Research Institute of Canada, Pointe Claire, Quebec, Canada
Filed Apr. 27, 1971, Ser. No. 137,783
Claims priority, application Canada, Jan. 20, 1971, 103,183
Int. Cl. B01d 53/34
U.S. Cl. 423—224
34 Claims

ABSTRACT OF THE DISCLOSURE

Objectionably odoriferous sulfur compounds are removed from gaseous emissions, e.g., methyl mercaptan and dimethyl sulfide or mixtures thereof, either alone or together with hydrogen sulfide, e.g., kraft-recovery furnace stack gases, in industrial operations. The removal is achieved by the use of alkaline or near neutral scrubbing solutions containing defined minimum amounts of certain phenolic compounds, e.g., phenol, dihydroxy phenols, trihydroxy phenols, substituted phenols and derivatives thereof as additional scrubbing agents, in the presence of gaseous oxygen. By this procedure, the absorption efficiency of the alkaline aqueous solution is increased and the hydrosulfide ions are substantially instantaneously converted to soluble sulfate and thiosulfate ions.

(C) BACKGROUND OF THE INVENTION

(1) Field of the invention

This invention relates to the abatement of air pollution resulting from any industrial process, where at least one of the objectionable components in a gas stream which is emitted to the atmosphere is hydrogen sulphide or organic sulphur compounds, for example, methyl mercaptan, dimethyl sulphide, carbon disulphide, etc. More particularly, the invention relates to the reduction in the emission of the above-mentioned objectionably odoriferous compounds originating from kraft pulp mills, specifically from recovery furnaces, lime kilns, smelt tanks, blow tanks, digester relief systems, pulp washers, and from black liquor evaporators in kraft mills, or from petroleum refineries.

Air pollution caused by objectionably odoriferous sulphur compounds, for example, hydrogen sulphide, mercaptans and mercaptan ethers, for example, dimethyl sulphide are particularly objectionable to communities located in the vicinity of industrial establishments such as, for example, kraft pulp mills, namely, in recovery furnace stack gases as well as in power boiler stack gases. Such gases can cause objectionable odor as well as corrosion and toxicity problems in the ambience of the source. This is because even extremely small quantities, typically 5 to 50 parts per billion of these compounds present in the atmosphere can be detected by the human nose, and higher levels can cause great discomfort to those who are exposed to these chemicals, since they have most unpleasant odors. Because of the low odor thresholds which are characteristic of these sulphur compounds, a treatment process for their removal, when this is called for, has to be highly efficient.

(2) Description of the prior art

The suitability of alkaline solutions, containing e.g. $Na_2CO_3$ or NaOH for removing $H_2S$ is well known. These solutions, however, have very little capacity for absorbing organic sulphur compounds, for example, mercaptans (e.g. methyl mercaptan) and sulphides (e.g. methyl sulphide and dimethyl disulphide). In addition, the process using an equilibrated mixture of $Na_2CO_3/NaHCO_3$ has been suggested but, while it would remove $H_2S$, it would remove little or no $CH_3SH$ from kraft recovery furnace stack gases. Another deficiency is that the $$Na_2CO_3/NaHCO_3$$

mixture would have to be regenerated in a separate reactor which would mean extra capital and operating cost.

(D) SUMMARY OF THE INVENTION

(1) Aims of the invention

An object of an aspect of the present invention is the provision of a treatment process for the high efficiency removal of objectionably odoriferous compounds from a gaseous stream, even if a variety of these sulphur compounds is present in the gas stream that is to be discharged into the atmosphere.

An object of another aspect of this invention is the provision of such a process which is efficient in removing any combination of the above-mentioned objectionably odoriferous compounds by the use of a treating agent which may be derived from the malodorous portions of the product produced by the main process.

(2) Main Statement of Invention

By a broad aspect of this invention, a process is provided for the at least partial removal of objectionably odoriferous sulphur compounds from a gaseous stream containing such compounds. The process is an improvement in the simultaneous absorption and oxidation of objectionably odoriferous sulfur compounds from a gaseous stream containing methyl mercaptan and dimethyl sulfide or mixtures thereof, either alone or together with hydrogen sulfide. The process involves intimately contacting and scrubbing the gaseous stream with an aqueous solution which consists essentially of an inorganic alkaline scrubbing agent at a near neutral-to-alkaline pH range, in the presence of at least a stoichiometric amount of oxygen gas to oxidize the odoriferous sulfur compounds to thiosulfate or sulfate. The improvement involves incorporating, in the aqueous alkaline solution, a catalytic quantity of phenol, guaiacol, hydroquinone, catechol, pyrogallol, resorcinol, vanillin, substituted vanillin, syringyl aldehyde, substituted syringyl aldehyde or mixtures thereof. The phenolic compound as above defined is present in a sufficient concentration to increase the absorption efficiency of the alkalnie aqueous solution. By this improved procedure, the hydrosulfide ions are converted substantially instantaneously to sulfate and thiosulfate ions.

By another aspect of this invention, a continuous process is provided for the removal of objectionably odoriferous sulphur compounds from a gaseous stream by the simultaneous absorption and oxidation thereof, said gaseous stream containing a member selected from the groups consisting of methyl mercaptan and dimethyl sulfide and mixtures thereof, which comprises: continuously passing the gases upwardly through a gas contacting zone, in intimate scrubbing contact both with a moving scrubbing agent consisting essentially of an inorganic alkaline scrubbing agent at a near neutral-to-alkaline pH range in the presence of at least a stoichiometric amount of oxygen gas to oxidize said odoriferous sulfur compound to thiosulfate or sulfate, the improvement which comprises incorporating in said aqueous solution a catalytic quantity of a phenolic compound selected from the group consisting of phenol, guaiacol, hydroquinone, catechol, pyrogallol, resorcinol, vanillin, substituted vanillin, syringyl aldehyde and substituted syringyl aldehyde, said phenolic compound being present in a sufficient concentration to increase the absorption efficiency of the alkaline aqueous solution and to convert hydrosulfide ions substantially instantaneously to sulfate and thiosulfate ions; continuosly withdrawing scrubbed gases from the gas contacting zone; continuously withdrawing scrubbing liquor containing said sulfate and thiosulfate ions from the gas contacting zone; and continuously recycling a major amount, more than 50%, of the withdrawn scrubbing liquor back to the gas contacting zone.

(3) Variants and embodiments of the invention

Thus, the present invention provides in one of its aspects, a process for removing with high efficiency, objectionably odoriferous sulphur compounds by routing the gases to be treated through a suitable wet scrubber where the scrubbing medium comprises an aqueous solution of an alkaline scrubbing agent containing one or more different types of suitable phenolic compounds. Although at least some alkalinity is important to obtain maximum benefit from the process of this invention, the process is operable at pH's of about 6 or 7.

The present invention is an improvement over the conventional alkaline scrubber and it has the additional advantage of regenerating $Na_2CO_3/NaHCO_3$ solution in situ by converting the HS to $S_2O_3$ and $SO_4$ virtually instantaneously. Thus, no separate regenerator reactor is required. In addition, the absorption efficiency of the alkaline solution is very much enhanced by the presence of phenols.

The present invention embraces the use of phenolic substances, usually in small concentrations, which need not be removed from the spent solution before the latter is introduced into a process stream to save chemical values. The amount used may generally be described as a catalytically effective amount. The numerical value will depend on the particular phenol selected. In general, the greater the amount of phenol, the more effective will be the process coupled with a longer life of the catalyst. Practical considerations of water solubility, cost and the handling problems of highly viscous solutions also govern the amount of phenol to be used. Some phenols show a significant utility at concentrations as low as 20 p.p.m. while other phenols require much higher concentrations. For example, using catechol, a significant effect is evident at concentrations of 100 p.p.m. or less. Using phenol requires a concentration of several hundred p.p.m. In some instances, concentration of phenols as high as 5 or 10% by weight may be used.

The phenolic compound is one having at least one phenolic hydroxide group in the aromatic ring or rings. Examples of suitable such phenolic compounds include phenol, catechol, hydroquinone, pyragallol, resorcinol, guaiacol, vanillin, substituted vanillins, syringylaldehyde, and substituted syringylaldehyde.

Other phenolics which might be mentioned include: the methyl, ethyl or propyl substituted phenols; substituted phenols, for example, chlorophenol, para phenyl phenol, chloroglucinol, or the meta or para cresol, m-xylenol, and β-naphthol; dinuclear phenols, for example, 2,2-bis(p-hydroxyphenol)propane and bis(p-hydroxyphenyl)methane; substituted phenols having at least one reactive position ortho or para to a phenolic hydroxyl and one or more univalent radicals, such as, for example, alkyl, cycloalkyl, aryl, alkenyl, alkoxy, or additional phenolic hydroxyl groups in replacement of hydrogen atoms of the benzene nucleus; namely the alkyl and cycloalkyl substituted phenols, for example, 2,3,5,6-tetra methyl phenol, ethyl and diethyl phenols, butyl and dibutyl phenols, amyl phenols, octyl phenols, para cyclohexyl phenol and 2,6-dicyclohexyl phenol; the aryl substituted phenols, namely paraphenyl phenol and 3,5-diphenyl phenol; phenols having alkenyl radicals, i.e. a univalent radical having a carbon to carbon double bond, namely crotyl phenol, allyl phenol, o-vinyl phenol, 1,3-diallyl phenol and cardanol (a phenol obtained by heat-treatment of cashew nut oil);

mono and poly alkoxy substituted phenols, for example, the isomeric methoxy phenols, ethoxy phenols and butoxy phenols; higher radicals, for example, 2-ethyl hexoxy phenol; polyalkoxy phenols, namely, pyrogallol 1,3-dimethyl ether and antiarol; phenols containing more than one phenolic hydroxyl group, for example, phloroglucinol; phenols having different radicals on the benzene nucleus, for example, orcinol, methyl phloroglucinol, 4,6-mesorcinol, 4,6-diethyl orcinol, 2,5,6-trimethyl resorcinol, 4-ethyl-5,6-dimethyl resorcinol, eugenol, iso-eugenol and 3-ethoxy - 4 - hydroxy - 1 - methyl benzene (disclosed in Bender et al. U.S. Pat. No. 2,744,882); the diphenols represented by the general formula

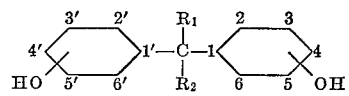

in which the phenolic hydroxyl groups may be in the 2,2'; 2,3'; 2,4'; 2,5'; 2,6'; 3,3'; 3,4'; 3,5'; 3,6'; 4,4'; 4,5'; 4,6'; 5,5'; 5,6'; and 6,6' positions on the aromatic rings, and in which $R_1$ and $R_2$, separately, may be hydrogen, methyl, ethyl, propyl, isopropyl, butyl isobutyl, pentyl, isopentyl, hexyl, isohexyl, a cyclohexyl, including the methyl, ethyl, propyl, butyl, pentyl and hexyl substituted cyclohexyls, a phenyl, including the methyl, ethyl, propyl, butyl, pentyl and hexyl substituted phenyl; and in which $R_1$ and $R_2$ taken together may be a cyclohexyl or a phenyl group, including the methyl, ethyl, propyl, butyl, isobutyl, pentyl, hexyl, substituted cyclohexyls or substituted phenyls, such that the total number of carbon atoms in $R_1$ and $R_2$ does not exceed twelve; in which, when $R_1$ and $R_2$, separately, or $R_1$ and $R_2$, collectively, are phenyl, the aromatic rings may contain fluorine and chlorine substituents, as in the fluorophenyls, including the monofluorophenyls, the difluorophenyls, the trifluorophenyls, the chlorophenyls, the dichlorophenyls, the trichlorophenyls, and the fluorochlorophenyls; and including the 2,2'; 2,3'; 2,4'; 3,3'; 3,4'; and 4,4' isomers of dihydroxydiphenyl methane, $$CH_2(C_6H_4OH)_2$$

of dihydroxydiphenylmethylmethane, $$CH_3CH(C_6H_4OH)_2$$

of dihydroxydiphenyldimethylmethane, $$(CH_3)_2C(C_6H_4OH)_2$$

of dihydroxydiphenylethylmethylmethane, $$C_2H_5C(CH_3)(C_6H_4OH)_2$$

of dihydroxydiphenyldiethylmethane, $$(C_2H_5)_2C(C_6H_4OH)_2$$

of dihydroxydiphenylmethylpropylmethane, $$CH_3C(C_3H_7)(C_6H_4OH)_2$$

of higher homologs up to and including the mono- and dihexyl and mono- and dicyclohexyldiphenylolmethanes, of dihydroxydiphenylmethylphenylmethane, $$CH_3C(C_6H_5)(C_6H_4OH)_2$$

of dihydroxydiphenylethylphenylmethane, $$C_2H_5C(C_6H_5)(C_6H_4OH)_2$$

of dihydroxydiphenylpropylphenylmethane, $$C_3H_7C(C_6H_5)(C_6H_4OH)_2$$

of dihydroxydiphenylbutylphenylmethane, $$C_4H_9C(C_6H_5)(C_6H_4OH)_2$$

of dihydroxydiphenyltolylmethane, $$(CH_3C_6H_4)CH(C_6H_4OH)_2$$

of dihydroxydiphenyltolylmethylmethane, $$(CH_3C_6H_4)C(CH_3)(C_6H_4OH)_2$$

and higher homologs thereof up to and including a total of twelve carbon atoms in the groups ($R_1$ and $R_2$) attached to the methane or connector carbon atom to which the two phenylol groups are attached; and of diphenylolcyclohexane, $C_6H_{10}(C_6H_4OH)_2$ and homologs thereof; in which substituent groups may also be present on the aromatic ring of one or both of the phenylol groups of the foregoing diphenols, 4,4'-dihydroxydiphenyl isomers, for instance, possibly having the 2, 3, 5, 6, 2', 3', 5' and 6' positions available for substituents, e.g. the lower alkyl groups as methyl, ethyl, propyl, butyl, pentyl, and hexyl and the halogens, fluorine and chlorine; (disclosed in Bender et al. U.S. Pat. No. 2,506,486); trinuclear phenols, for example, 1,1,3-tris(hydroxyphenol)propane, 1,1,3-tris(hydroxytolyl)propane, 1,1,3 - tris(hydroxyphenol)-propene-2, 1,1,3 - tris(hydroxyphenyl)-2-methyl-propane, and other higher polynuclear phenols.

The phenolic compounds may be obtained in the relatively pure state commercially. In preferred embodiments, however, the phenolic compounds may be obtained from the phenolic substances present already in the gaseous stream which is being scrubbed. Other commercially available effluent or by-product liquid streams containing the phenolic compounds can be obtained at the mill or plant sites and used as the additive of the scrubbing medium within the scope of the present invention. The phenolic compounds may also be obtained from by-product or waste streams from the production of e.g., vanillin, coke (from coal), etc. In the latter case of coke production, certain condensate streams are known to contain various types of phenolics, including phenol and in many cases catechol. The production waste gases from the petroleum refining industry, or, in fact, any other gas containing both phenolic compounds and objectionably odoriferous sulphur compounds may be used as a source of phenolic compounds.

The presence of at least a stoichiometric amount of oxygen gas to oxidize mostly in the scrubbing solution the oxidizable sulphur compounds present in the gas stream is necessary in order to facilitate the continuing absorption of the $H_2S$ and/or the methyl mercaptans. There is no upper limit on the amount of oxygen gas to provide an operable process, but the amount is dependent, to some extent, on the amount of oxidizable sulphur compounds present in the gaseous stream. It is clear that the more oxygen present, the faster the reaction, and hence the higher will be the efficiency of the scrubbing reaction. in some instances, a minimum of 0.5% by volume would be sufficient to achieve some sulphur compound removal, but, in practical terms, an amount of about 1 to about 4% may be used, although the efficiency would not be reduced by using more gaseous oxygen.

For many of the gaseous streams, such as furnace exit gases, being treated, there is already sufficient oxygen present. Where oxygen must be added, it can be done by incorporating air or other oxygen-containing gas into the gaseous stream by suitable means well known to those skilled in the art.

Such air of other oxygen-containing gas may also be added in a separate sparging zone, e.g., in the bottom (liquid sump) section of the scrubber itself and thus be used to sparge the scrubbing solution. That solution is one which has just gone through a cycle of contacting with the contaminated gas. This will reduce the concentration of reduced sulphur compounds building up in the scrubbing solution, by oxidation of e.g., $HS^\ominus$ ions into $S_2O_3^\ominus$ and partly $SO_4^\ominus$ ions, mercaptans (and/or mercaptides) into disulphides and, to a limited extent, perhaps into acidic compounds, such as, for example, the sulphonates. In this way, the $H_2S$ and mercaptans will have increased absorptive capacity in the scrubbing solution, and thus the scrubbing solution will have higher efficiency in removing such reduced sulphur compounds.

The air or oxygen-containing gas coming out of the sparging zone could then join the stream of the furnace gas to be treated inside the scrubber itself. Thus the oxygen content of the gas will (i) be further utilized for oxidation of the reduced sulphur compounds during the actual scrubbing step, and (ii) further reduce the concentration of the undesirable reduced sulphur compounds in the treated gas by dilution.

In another alternative, this air or oxygen-containing gas could be added in a sparging zone outside the scrubber itself and be used to sparge the scrubbing solution discharging from the bottom of the scrubber to achieve the same two additional improvements described above. One way of disposing of this air or oxygen-containing gas discharged from the sparging zone would be to mix it with the stream of gas to be scrubbed.

Another way of disposing of this air or oxygen-containing gas that has been used for the oxidation of absorbed reduced sulphur compounds and discharged from the sparging zone, would be to add it to the air supply of a recovery or other furnace.

Yet another way of applying the same principles would be to combine the above two configurations and use the air or oxygen-containing gas discharged from the sparging zone by mixing one part of it with gas to be treated and mixing the other part with the furnace air supply.

The present invention is not, of course, restricted to the above-mentioned specific configurations of utilizing the internal and external sparging with any oxygen-containing gas and the further utilization or disposal of the said gas discharging from the sparging zones. Other suitable combinations which may be more desirable under certain special conditions will be obvious to those skilled in the art.

The aqueous solution of alkaline scrubbing agent may be an aqueous solution of any suitable alkaline agent, such as, for example, sodium carbonate, potassium carbonate, lithium carbonate, sodium hydroxide, potassium hydroxide, lithium hydroxide, calcium hydroxide, magnesium hydroxide, barium hydroxide, sodium bicarbonate, potassium bicarbonate, lithium bicarbonate or suitable mixtures or combinations of these alkaline agents. The concentration of the alkaline agent is determined by practical considerations of water solubility and economics.

The pH of the scrubbing solution is generally in the neutral-to-alkaline range. Alkaline solutions of pH in excess of 7.5 are desired with a pH range of 7.5–10 being preferred. Limited removal of the objectionably odoriferous sulphur compounds may be obtained even if the pH is 6–7.5.

The temperature of the scrubbing solution is generally within the range of 20° C. to the boiling point of the solution. Preferably, it is at 35° C.–90° C. at atmospheric pressure. The scrubbing may, of course, take place at sub-atmospheric, atmospheric or superatmospheric pressures.

Tests showing the removal of $H_2S$, $CH_3SH$, $(CH_3)_2S$ and $(CH_3)_2S_2$ from simulated recovery furnace stack gases were carried out by scrubbing the gases with $Na_2CO_3/NaHCO_3$ solutions containing different phenols separately and together. Efficient removal of $H_2S$ and $CH_3SH$ in particular were noted. Laboratory experiments were carried out in which the effectiveness of various phenolic compounds (e.g. phenol, guaiacol, catechol and hydroquinone) present in $Na_2CO_3/NaHCO_3$ solution was tested and a comparison was drawn against a $Na_2CO_3/NaHCO_3$ solution not containing phenols. $Na_2CO_3/NaHCO_3$ solutions containing these phenols (collectively or individually) were used as absorption reagents to absorb $H_2S$ and $CH_3SH$ etc. in the presence of $CO_2$ and $O_2$ from simulated kraft recovery furnace stack gas mixtures.

(E) BRIEF DESCRIPTION OF THE DRAWINGS

In the accompanying drawings:

FIG. 7 is a schematic flow diagram of a modified absorption apparatus to carry out the process of an aspect of the present invention, namely, where the oxygen-containing gas is introduced into the system through a sparger built into the scrubber;

FIG. 8 is a schematic flow diagram of a modified absorption apparatus to carry out the process of another aspect of the present invention, namely where the oxygen-containing gas is introduced into the system through a sparger situated outside the scrubber, the outlet gas from the sparger mixing with the gas to be treated; and FIG. 9 is a schematic flow diagram of a modified absorption apparatus to carry out the process of yet other aspects of the present invention, namely whereby the oxygen-containing gas is introduced into the system through a sparger situated outside the scrubber, the outlet gas from the sparger mixing with the furance air supply, with the discharge gases from the furnace providing gases to be treated.

Figure 1:
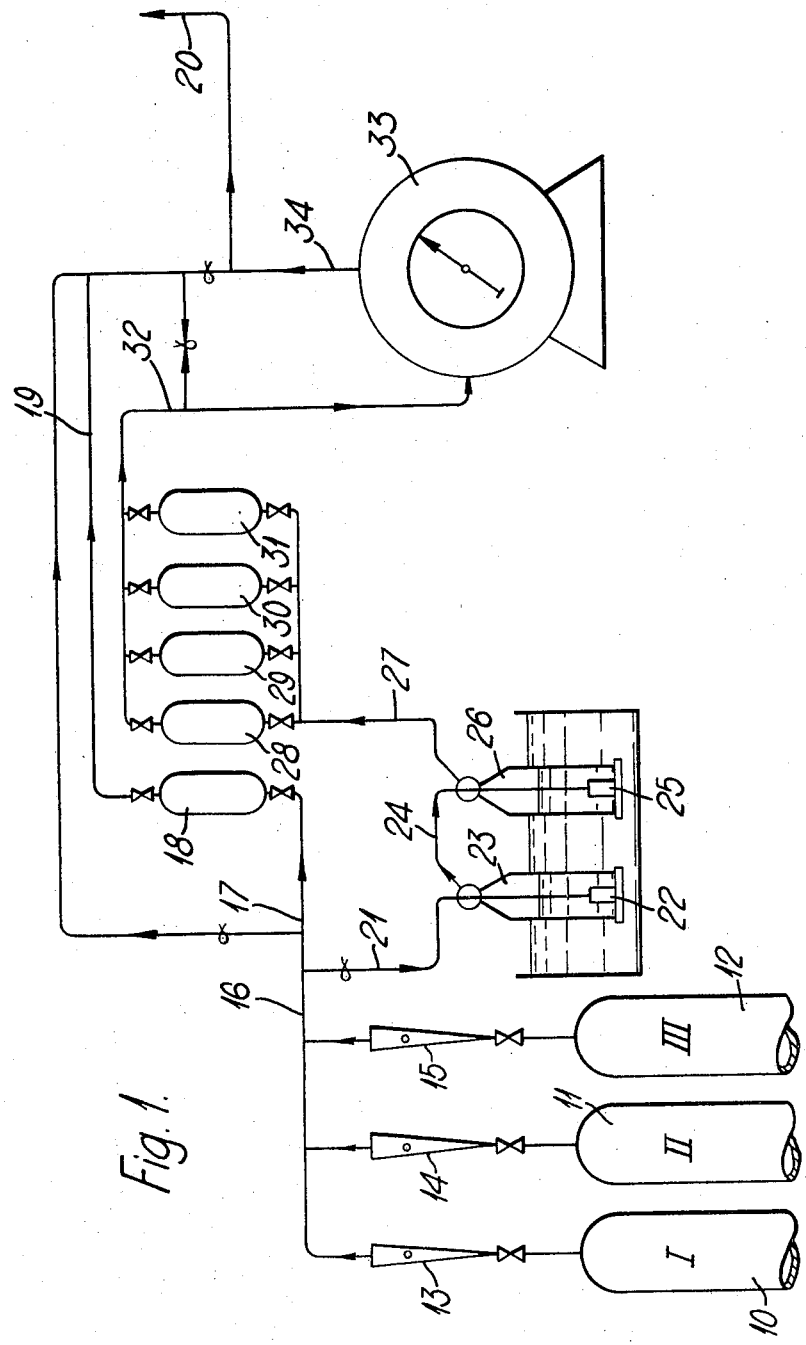
FIG. 1 is a schematic flow diagram of the absorption apparatus used in testing the present invention.

(F) SPECIFIC DESCRIPTION OF THE DRAWINGS (1) Description of FIG. 1

In general terms, referring to FIG. 1, the apparatus centres around a laboratory bubbler (300 ml. capacity) containing 250 ml. of the scrubbing liquor and kept in a temperature-controlled bath. A gas mixture simulating the composition of recovery furnace stack gases was produced by metering different constituent gases. This mixture was bubbled through the scrubbing solution kept at 75° C. and samples of the inlet and outlet (treated) gas were analyzed. $CO_2$ and $O_2$ were analyzed on an Orsat apparatus and $H_2S$, $CH_2SH$, $(CH_3)_2S$ and $(CH_3)_2S_2$ on a gas chromatograph.

Various gases in bulk gas cylinders 10, 11, 12 are metered through flow rators 13, 14 and 15 to line 16. Line 16 leads, via line 17, to line gas sampler 18, from where it is an analyzed. It is discharged through line 19 to vent line 20.

The gas mixtures were scrubbed by passing them along line 21 through a sparge 22 in water bottle 23, and then by passage through line 24 through a sparge 25 in absorbent solution 26. The water is provided to give an accurate simulation of the actual gaseous stream being treated, and also since lengthy runs with dry gases would tend to remove too much water from the aqueous solution of the absorbent. The absorbed gas is removed through line 27 to gas samplers 28, 29, 30, 31. The gases are withdrawn from the samplers and analyzed by means (not shown). The gases then pass through line 32 to gas meter 33 and then via line 34 to vent line 20. A bypass line from line 16 to vent line 20 is also provided.

Figure 2:
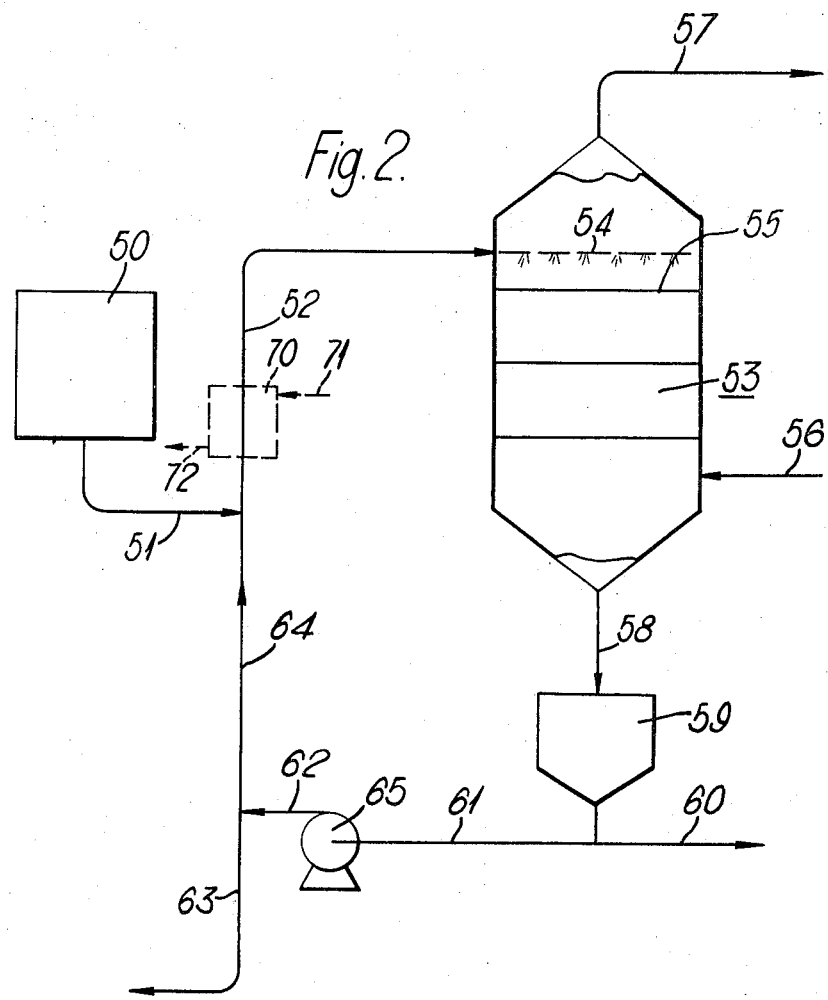
FIG. 2 is a schematic flow diagram of the absorption apparatus which may be used in an industrial plant, e.g., a kraft mill, to carry out the process of this invention.

(2) Description of FIG. 2

In general terms, with reference to FIG. 2, it is seen that, in any suitable contacting device, which could be a venturi scrubber or similar scrubber or a packed column or a column fitted with any other internal contacting device, gas will be brought in through contact with the scrubbing solution. Most of the scrubbing solution will be circulating in sufficient quantities to provide optimum liquid and gas contact at a temperature of between 25° C. and 100° C. (or the boiling point of the scrubbing solution if higher than 100° C.) but preferably between 35 to 90° C.

A part of the solution will be continuously withdrawn and sent for disposal or for the reuse or recovery of the $Na_2CO_3$ or other chemical values. An equivalent quantity of scrubbing solutions will be introduced into the circulating stream to compensate for the loss of $Na_2CO_3$ or other alkaline agents, phenols and water from the system.

More specifically in FIG. 2, the makeup liquor from tank 50 is led via line 51 to input line 52 to the contacting device as described above. The scrubbing liquor is shown being sprayed, by spray nozzles 54 or other suitable devices onto a contacting place or bed 55. Gas to be scrubbed is fed to the contacting apparatus 53 through inlet line 56, and passes upwardly countercurrently to the downwardly moving scrubbing solution. It is noted that, while a counter-current contacting apparatus has been specifically described, other contacting apparatus, such as venturi scrubbers, where the contacting is cocurrent, are equally useful. In general terms, scrubbing of these sulphur compounds can be carried out in any suitable manner, using contacting equipment which is suitable for efficient gas-liquid contacting. Examples of such equipment include cyclone scrubbers, impingement scrubbers, dynamic scrubbers, fog scrubbers, pebble bed scrubbers, multidynamic scrubbers, submerged nozzle scrubbers, jet scrubbers, venturi scrubbers, turbulent contact absorbers, cascade-type scrubbers, etc. The scrubbed gas is led to the stack through gas outlet line 57.

Th spent scrubbing solution passes through drain line 58 to holding tank 59. The outlet from the holding tank is provided with line 60, to convey spent solution to process, and line 61. Line 61 leads to pump 65 which discharges via line 62 to discharge line 63 and recycled line 64. Discharge line 63 can also serve as a transfer line for the spent liquor to be utilized in some suitable fashion.

Where the scrubbing agent already containing phenolics is available in large volume, the scrubbing soluton may be used in a "once-through" operation. In such instance, recycle line 64 may be omitted. The spent scrubbing solution would have a pH of about 6–14.

In either of the two above-described embodiments of FIG. 2, the scrubbing process could for part of the heat recovery system, where the source of the heat content of the gases being treated would be removed as hot water. In such case, a heat exchanger 70 having cold water inlet 71 and warm water outlet 72 could be placed around input line 52, as shown in broken lines.

(3) Description of FIG. 7

Turning now to FIG. 7, it will be noted that those parts in FIG. 7 which are the same as parts in FIG. 2 are given the same reference number, and hence do not need to be further described. The liquid sump section 700 of the gas scrubber 53 provides a sparging zone 701, at the bottom of which is a funnel-shaped sparger 702 fed with oxygen-containing gas through inlet line 703. The oxygen oxidizes at least a portion of the reduced sulphur compounds, as described above. The effluent, oxygen-containing gas, in the form of bubbles 704, passes upwardly into the gas treating zone 53, to be mixed with the gas to be treated.

(4) Description of FIG. 8

Turning now to FIG. 8, the scrubbing solution drain the 58 now leads, via line 801, to the inlet 802 of a gas sparger 803. The gas sparger 803 includes a lower gas sparging zone 804 at the bottom of which is a funnel-shaped sparger 805 fed with oxygen-containing gas through inlet line 806. The oxygen oxidizes at least a portion of the reduced sulphur compounds, as described above. The effluent, oxygen-containing gas, in the form of gas bubbles 807, passes upwardly and is discharged out through outlet line 808 to be mixed with gas to be treated in inlet line 66.

The gas-treated scrubbing liquor passes via line 809 to the inlet of pump 65 which is used to recycle the scrubbing liquor as previously described.

(5) Description of FIG. 9

FIG. 9 is almost identical to FIG. 8 and shows two variations. In the first variation, line 808 leads to line 901 which conducts the discharge outlet gas to mix with furnace air supply. A portion of such gas later becomes gas to be treated.

The second variation is to have two gas conducting lines, namely 901 and 902, so that a part of the discharged outlet gas from the sparging zone 804 is mixed with the furnace air supply gas, and a part of the discharged outlet gas from the sparging zone is mixed with the gas to be treated.

(g) Description of examples

The following are examples of aspects of the present invention.

In Examples 1 and 2, the general procedure used was as follows:

Approximately 350 ml./min. of the gas mixture were passed through 250 ml. solution of $Na_2CO_3$ (with and without one or more phenolic compounds present in the solution). $Na_2CO_3$ concentration was 2% by weight (5 g. in the 250 ml. solution) and that of various phenolic additives between 0.01–0.04% by weight, or 100 to 400 parts per million (p.p.m.).

Absorption efficiencies were calculated and plotted as a function of time for comparison between the absorption efficiencies of alkaline solutions containing different phenolic compounds with respect to the absorption of $H_2S$, $CH_3SH$, $(CH_3)_2S$ and $(CH_3)_2S_2$.

For the purpose of Examples 1 and 2, the simulated stack gas mixtures used had the following ranges of composition:

|  | Percent |
|---|---|
| $O_2$ | 3.8–4.8 |
| $CO_2$ | 17.0–18.1 |
| $H_2S$ | 0.22–0.28 |
| $CH_3SH$ | 0.02–0.09 |
| $N_2$ | Balance |

EXAMPLE 1

A 250 ml. solution containing 2% by weight of $Na_2CO_3$ and 0.04% by weight of total phenols (0.01% each of phenol, guaiacol, catechol and hydroquinone) was tested and compared to using a solution of 2% by weight of $Na_2CO_3$ without any phenols present. The results are plotted in FIG. 3.

Figure 3:
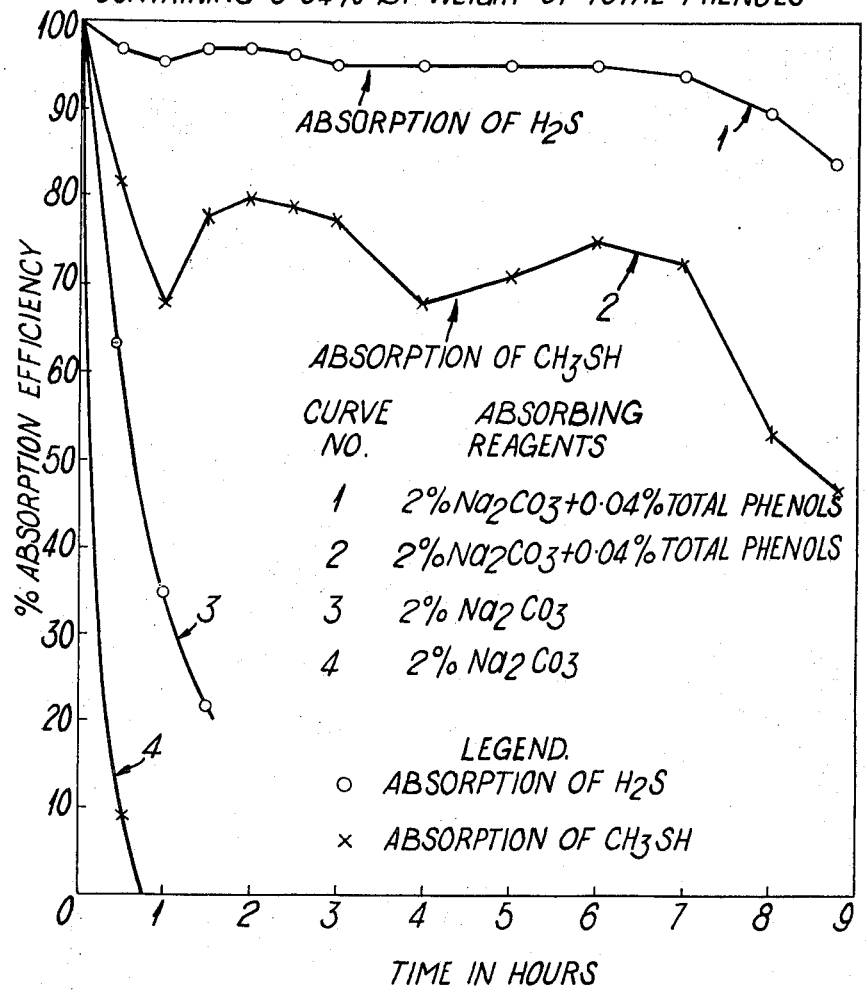
FIG. 3 is a graph showing the absorption efficiency of a 2% $Na_2CO_3$ solution with and without containing 0.04% by weight of total phenolic compounds.

From FIG. 3, it is evident that the $H_2S$ absorption efficiency of the solution containing phenols remained at 90% and above up to 5 hours and at 84% up to 8 hours. The corresponding level of $CH_3SH$ absorption was 80% for 2 hours and 70% for 5 hours. The absorption efficiency of the $Na_2CO_3$ solution without phenols was very poor. The efficiency with respect to $H_2S$ absorption fell below 50% in 40 minutes, that of $CH_3SH$ fell below 50% in less than 20 minutes. This indicated that the presence of these phenols greatly enhanced the capacity of the $Na_2CO_3$ solution to absorb $H_2S$ and $CH_3SH$.

EXAMPLE 2

Experiments were performed to see the effect of individual phenols for improving the absorption efficiency of the $Na_2CO_3$ solution. Only one phenolic compound was added at a concentration of 0.04% by weight to 250 ml. solution of 2% by weight of $Na_2CO_3$.

Temperature of the scrubbing solution was maintained at 75° C. Graphs of absorption efficiencies with respect to $H_2S$ and $CH_3SH$ are given in FIGS. 4 and 5 respectively. Results obtained with $Na_2CO_3$ without any additive are also given in the same figures.

Figure 4:
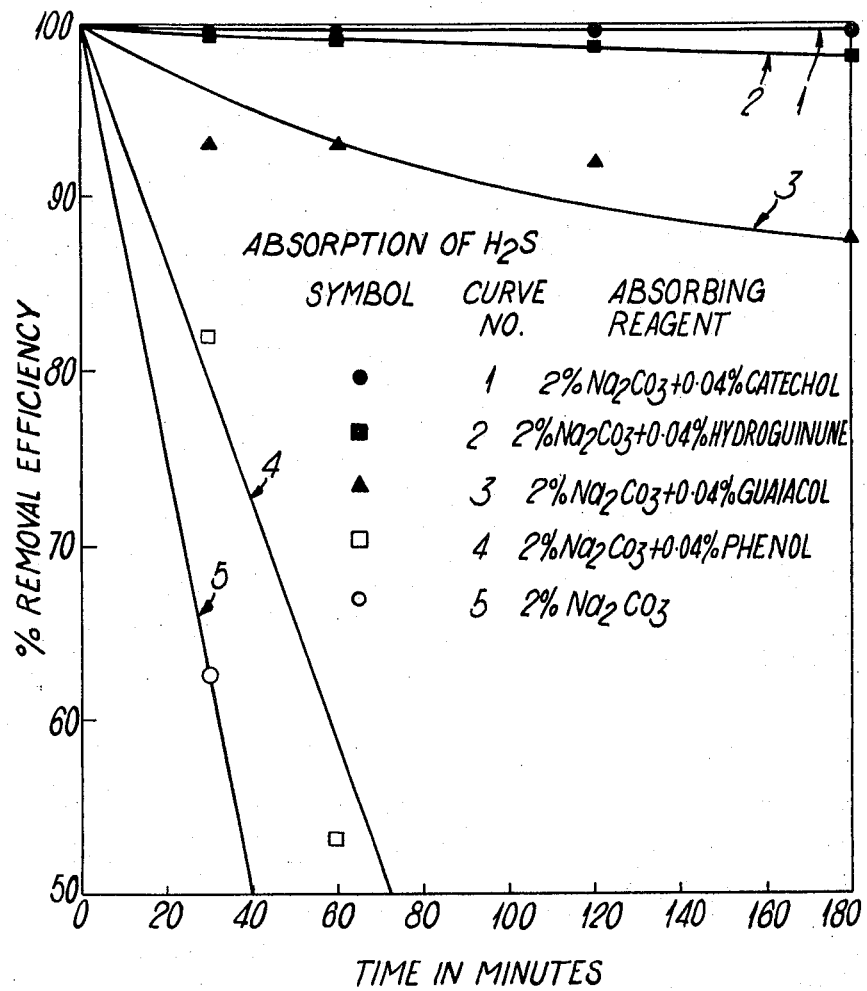
FIG. 4 is a graph showing the absorption efficiencies of various absorbents for $H_2S$.
Figure 5:
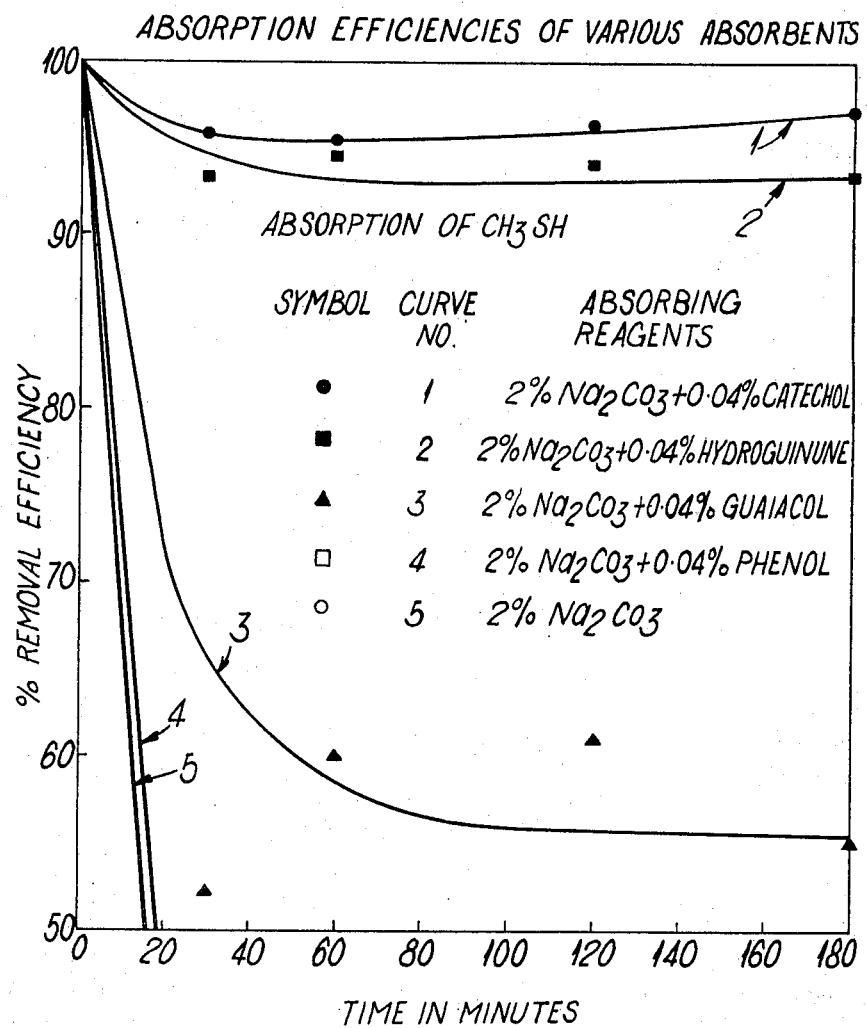
FIG. 5 is a graph showing the absorption efficiencies of various absorbents for $CH_3SH$.

It is seen from FIGS. 4 and 5 that catechol, hydroquinone, quaiacol and phenol all improved the efficiency of $Na_2CO_3$ solution as an absorption reagent for reduced sulphur compounds. The "activity" of the phenols actually tested in a 2% by weight $Na_2CO_3$ solution can be placed in the following order with respect to their effect on the removal of $H_2S$ and $CH_3SH$:

catechol > hydroquinone > guaiacol > phenol

Table 1 below shows that the $H_2S$ absorbed in Experiment 2 was largely oxidized into $Na_2S_2O_3$ and $Na_2SO_4$. As seen in Table 1, the distribution of Na and S in the partially spent solutions is given. Runs 119, 120, 121 were of 3-hour duration, while runs 122 and 123 were of 1½ hour duration. In the case of catechol, hydroquinone and guaiacol, $Na_2SO_4$ was formed in the decreasing order while $Na_2S_2O_3$ was formed in the increasing order. The presence of phenol ($C_6H_5OH$) did not show any strong catalytic effect. Some elementary sulphur seemed to have been formed in the case of catechol.

TABLE 1.—DISTRIBUTION OF Na AND S IN USED SOLUTIONS

| Run number | 119 | 121 | 120 | 122 | 123 |
|---|---|---|---|---|---|
| Solution composition | 2% $Na_2CO_3$, 0.04% catechol | 2% $Na_2CO_3$, 0.04% hydro- | 2% $Na_2CO_3$, 0.04% guaiacol | 2% $Na_2CO_3$, 0.04% phenol | 2% $Na_2CO_3$, |
| Duration, min | 180 | 180 | 180 | 90 | 90 |
| Distribution of Na as— | | | | | |
| $Na_2CO_3$, percent | 19.47 | 18.50 | 18.02 | 18.69 | 27.36 |
| $NaHCO_3$, percent | 72.17 | 73.36 | 76.02 | 78.48 | 70.00 |
| $Na_2SO_4$, percent | 6.78 | 3.70 | 1.36 | 0.53 | 0.50 |
| $Na_2S_2O_3$, percent | 1.58 | 4.44 | 4.60 | 2.30 | 2.14 |
| Total, percent | 100.00 | 100.00 | 100.00 | 100.00 | 100.00 |
| Distribution of S as— | | | | | |
| $Na_2SO_4$, percent | 56.16 | 29.17 | 12.90 | 18.75 | 17.65 |
| $Na_2S_2O_3$, percent | 26.03 | 70.83 | 87.10 | 81.25 | 76.47 |
| Unknown,[1] percent | 17.81 | 0.00 | 0.00 | 0.00 | 5.88 |
| Total | 100.00 | 100.00 | 100.00 | 100.00 | 100.00 |

[1] Probably elementary sulphur.

EXAMPLE 3

A 200 ml. solution containing 8% $Na_2CO_3$ (16 g.) at 75° C. was used as a scrubbing reagent to remove reduced sulphur compounds from actual kraft recovery furnace stack gas. The volumetric composition of the gas varied between the following limits:

| | | |
|---|---|---|
| $O_2$ | percent | 1.8–3.6 |
| $CO_2$ | do | 16.4–17.8 |
| $H_2S$ | do | 0.046–0.090 |
| $CH_3SH$ (by volume) | p.p.m. | 13–18 |
| $(CH_3)S$ (by volume) | p.p.m. | 2–5 |
| $(CH_3)_2S_2$ | | Nil |
| $N_2$ | | Balance |

Figure 6:
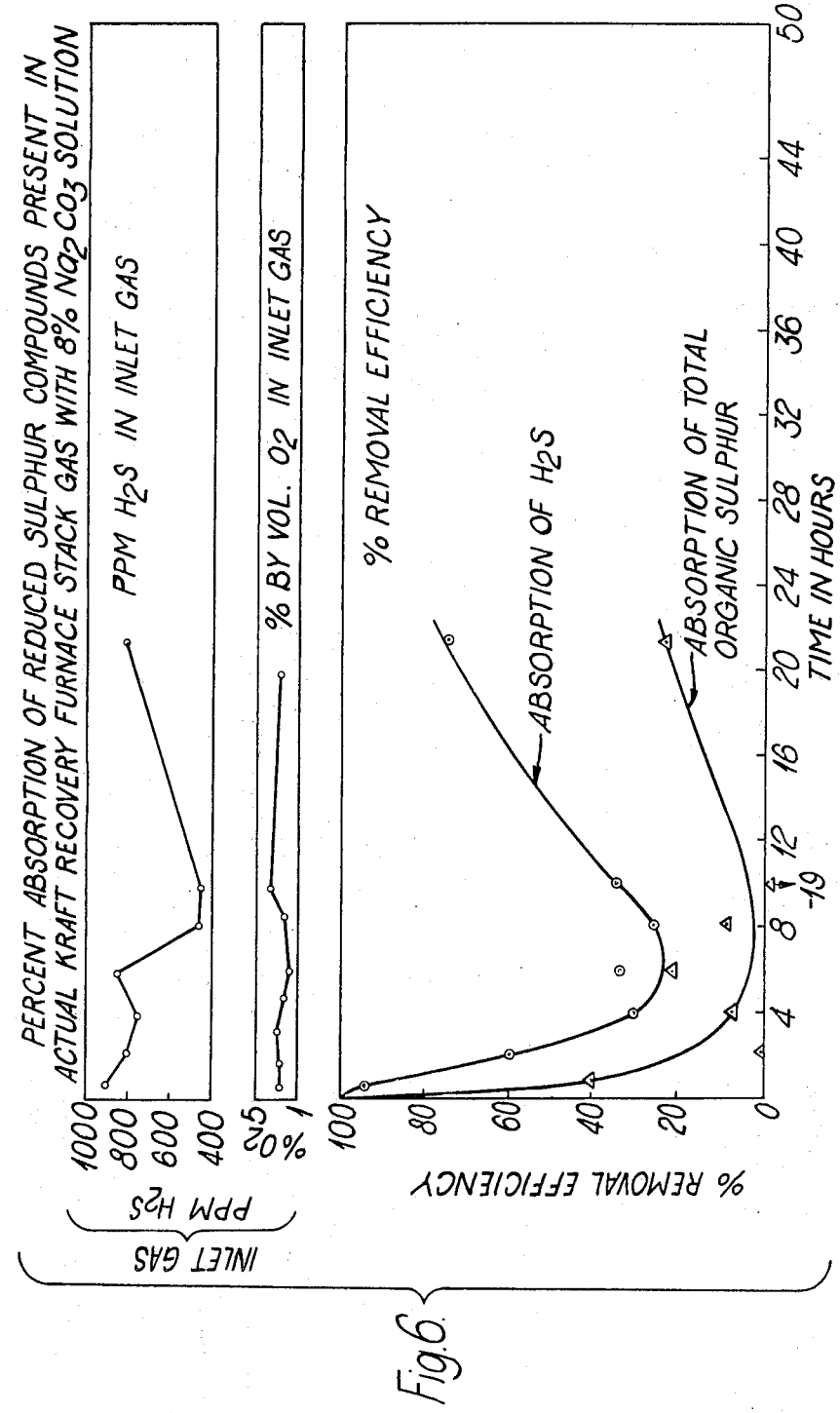
FIG. 6 is a graph showing the percent absorption, as a function of time, of reduced sulphur compound, present in actual kraft recovery furnace gas with 8% $Na_2CO_3$ solution and the phenolic compounds as accumulated from the gases.

The results are plotted in FIG. 6. FIG. 6 shows the percent removal efficiency of $H_2S$ and TOS [Total Organic Sulphur: $CH_3SH+(CH_3)_2S+(CH_3)_2S_2$] from the gaseous stream. It is clear from the figure that removal efficiency for $H_2S$ and TOS kept on falling for about the first 7 hours. After the expiration of 8 hours, removal efficiencies for $H_2S$ and TOS started climbing up. At 17 hours after the start of the run, part of the scrubbing solution was analyzed for various phenols and the following analytical values were obtained:

|  | P.p.m. w./v. |
|---|---|
| Phenol | 15 |
| Guaiacol | 120 |
| Hydroquinone [1] | 25 |

[1] Preliminary identification.

This tentatively proved that absorption performance of $Na_2CO_3$ solution gradually improved with the accumulation of phenols. Due to analytical difficulties only important phenols could be detected. In order to have further proof that phenolic compounds were present in the gases treated, the condensate from the actual kraft furnace stack gas was collected and analyzed for phenols.

Following composition was obtained:

|  | P.p.m. |
|---|---|
| Phenol | 30 |
| Guaiacol | 400 |
| Catechol | 0 |
| Hydroquinone | 0 |
| Other | 0 |

Analysis shows predominantly guaiacol only possibly because of its stability but it is possible other phenols may have been present in the original sample that was analyzed several days after sampling, and was stored at its original acidic pH of less than 6.

EXAMPLE 4

In this example, an effluent from a calcium bisulphite pulping process was used as a scrubbing medium. This effluent was originally the spent liquor to which $Na_2CO_3$ was added and then subjected to precessing to extract vanillin. The concentration of the components of special interests in the effluent was found as below:

| $Na_2CO_3$ | percent | 3.0 |
|---|---|---|
| Phenol | p.p.m. | 30 |
| Guaiacol | p.p.m. | 20 |
| Hydroquinone | p.p.m. | 20 |
| Vanillin [1] | p.p.m. | 125 |
| Syringaldehyde [1] | p.p.m. | 100 |

(Total solids were 14.94%)

[1] Substituted phenols.

200 ml. of the above effluent were used as scrubbing reagent at 75° C. The composition of the simulated gas mixture varied during the experiment in the following ranges:

|  | Percent |
|---|---|
| $O_2$ | 2.8–4.2 |
| $CO_2$ | 15.8–18.4 |
| $H_2S$ | 0.16–0.28 |
| $CH_3SH$ | 0.024–0.038 |

This solution was tested beyond 90 hours and up to 90 hours; the removal efficiency for $H_2S$ was 100% and for $CH_3SH$ was above 90%. However, some $CH_3SH$ was reappearing as $(CH_3)_2S_2$ and the total removal efficiency for TOS was less than 43% at 48 hours.

It is to be observed that although $SO_2$ was not present in the gases tested, those skilled in the art will recognize that they will be readily absorbed in the alkaline media and, to a lesser extent, in a nearly neutral media, on account of the well-known absorbability of $SO_2$ in alkaline and neutral media. Such absorption should be enhanced by the oxidation of $SO_3^=$ ions into $SO_4^=$ readily predictable from the appearance of substantial quantities of $SO_4^=$ ions in the solutions for which the analysis are given in Table 1.

If the process of the present invention is used in a kraft pulp mill, the $Na_2CO_3$ or NaOH solution being used as the make-up shall replace (partly or completely) the quantity of salt cake being added in the furnace to compensate for sodium and/or sulphur loss through the stack.

While it is, of course, not desired to be bound by any particular theory of operation, and although the true mechanism of absorption is not completely known yet, the phenolic compounds seem to have a pronounced beneficial effect on the absorptive capacity of the $Na_2CO_3$ solution.

The preceding examples can be repeated with similar success by substituting the generically or specifically defined variants of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:

1. In a process for the simultaneous absorption and oxidation of objectionably odoriferous sulphur compounds from a gaseous stream containing a member selected from the group consisting of methyl mercaptan, dimethyl sulphide and mixtures thereof, which process comprises intimately contacting and scrubbing said gaseous stream with an aqueous solution consisting essentially of an inorganic alkaline scrubbing agent at a near neutral-to-alkaline pH range, in the presence of at least a stoichiometric amount of oxygen gas thereby to oxidize said odoriferous sulphur compound to thiosulphate or sulphate, the improvement which comprises: incorporating in said aqueous solution a catalytic quantity of a phenolic compound selected from the group consisting of phenol, guaiacol, hydroquinone, catechol, pyrogallol, resorcinol, vanillin, substituted vanillin, syringyl aldehyde and substituted syringyl aldehyde, said phenolic compound being present in a sufficient concentration to increase the absorption efficiency of the alkaline aqueous solution and to convert hydrosulphide ions substantially instantaneously to sulphate and thiosulphate ions.

2. The process of claim 1 wherein the oxygen is present in an amount of at least 0.5% by volume.

3. The process of claim 1, wherein the oxygen is present in an amount of about 1% to about 5% by volume.

4. The process of claim 1 wherein the alkaline treating agent is sodium, potassium, or lithium carbonate, sodium, potassium or lithium hydroxide, calcium, magnesium or barium hydroxide, sodium, potassium or lithium bicarbonate or suitable mixtures of two or more thereof.

5. The process of claim 1, wherein the pH of the scrubbing agent is 6–7.5.

6. The process of claim 1 wherein the pH of the scrubbing agent is 7.5–10.

7. The process of claim 1 wherein the temperature is from 20° C. to the boiling point of the scrubbing solution.

8. The process of claim 1 wherein the phenolic compound is present in an amount of about 100 to about 400 p.p.m.

9. The process of claim 1 wherein the pH is 7.5–10 and the temperature is 35–90° C. at atmospheric pressure.

10. A process according to claim 1 where at least part of the phenolic compounds is accumulated in the scrubbing solution from the gases treated by the contact of the said scrubbing solution and the said gases.

11. A process according to claim 1 where at least part of the phenolic compounds present in the scrubbing solution is supplied by a phenolic by-product or waste stream.

12. The process of claim 11 wherein the waste stream is an effluent from a plant producing vanillin from spent pulping liquor.

13. The process of claim 11 wherein the waste stream is the condensate streams from a plant producing coke and/or coal gas.

14. The process of claim 11 wherein the waste stream is a by-product or waste stream from a petroleum refinery.

15. The process as claimed in claim 1 wherein the scrubbing solution is recycled many times at circulation rates sufficiently high to achieve good liquid-gas contacting, with a fraction of the recycled scrubbing solution being removed as a bleed with a corresponding amount of fresh solution introduced as make-up.

16. The process of claim 15 wherein the bleed is removed continuously.

17. The process of claim 15 wherein only a portion of the scrubbing solution is recycled.

18. The process of claim 1 wherein the scrubbing solution is used in an essentially "once-through" fashion.

19. The process of claim 1 wherein the scrubbing is carried out countercurrently.

20. The process of claim 1 wherein the scrubbing is carried out cocurrently.

21. A process according to claim 1 wherein said gaseous stream further comprises hydrogen sulfide.

22. The process of claim 1 wherein the phenolic compound is a mixture of phenol, guaiacol and hydroquinone.

23. A process according to claim 22 wherein said gaseous stream further comprises hydrogen sulfide.

24. The process of claim 1 wherein the phenolic compound is a mixture of phenol and guaiacol.

25. The process of claim 1 wherein the phenolic compound is a mixture of phenol, guaiacol, hydroquinone, vanillin and syringyl aldehyde.

26. In a continuous process for the removal of objectionably odoriferous sulfur compounds from a gaseous stream by the simultaneous absorption and oxidation thereof, said gaseous stream containing a member selected from the group consisting of methyl mercaptan, dimethyl sulphide and mixtures thereof, which comprises: continuously passing the gases upwardly through a gas contacting zone, in intimate scrubbing contact both with a moving scrubbing agent consisting essentially of an inorganic alkaline scrubbing agent at a near neutral-to-alkaline pH range in the presence of at least a stoichiometric amount of oxygen gas to oxidize said odoriferous sulphur compound to thiosulphate or sulphate, the improvement which comprises incorporating in said aqueous solution a catalytic quantity of a phenolic compound selected from the group consisting of phenol, guaiacol, hydroquinone, catechol, pyrogallol, resorcinol, vanillin, substituted vanillin, syringyl aldehyde and substituted syringyl aldehyde, said phenolic compound being present in a sufficient concentration to increase the absorption efficiency of the alkaline aqueous solution and to convert hydrosulphide ions substantially instantaneously to sulphate and thiosulphate ions; continuously withdrawing scrubbed gases from the gas contacting zone; continuously withdrawing scrubbing liquor containing said sulphate and thiosulphate ions from the gas contacting zone; and continuously recycling a more than 50% of the withdrawn scrubbing liquor back to the gas contacting zone.

27. The process of claim 26 including passing the withdrawn scrubbing liquor to a holding zone before it is recycled.

28. The process of claim 26 including the step of recovering heat values by passing the recycled scrubbing solution through a heat exchanger.

29. The process of claim 26 including passing oxygen-containing gas through a sparging zone in contact with scrubbing solution which has been in scrubbing contact with gas to be treated.

30. The process of claim 29 wherein the sparging zone is in the lower zone of the gas treating zone, comprising passing the gas effluent from the sparging zone directly to mix with the gas being treated and recycling liquid effluent from the sparging zone to the gas treating zone.

31. The process of claim 29 wherein the sparging zone is physically removed from the gas treating zone, comprising passing the gas effluent from the sparging zone directly to mix with the gas being treated and recycling liquid effluent from the sparging zone to the gas treating zone.

32. The process of claim 29 wherein the sparging zone is a zone physically removed from the gas treating zone, comprising passing the gas effluent to a zone from which, after further treatment, it provides gas to be treated.

33. The process of claim 32 wherein a portion of the gas effluent is passed directly to mix with the gas being treated and the rest of the gas effluent is passed to a zone from which, after further treatment, it provides gas to be treated.

34. A process according to claim 26 wherein said gaseous stream further comprises hydrogen sulfide.

References Cited

UNITED STATES PATENTS

| | | | |
|---|---|---|---|
| 1,792,097 | 2/1931 | Jacobson | 423—225 |
| 2,772,146 | 11/1956 | Pippig | 423—220 X |
| 3,554,859 | 1/1971 | Murray | 423—224 X |
| 3,099,535 | 7/1963 | Maezawa et al. | 423—573 |
| 3,459,495 | 8/1969 | Iida et al. | 423—226 |

EARL C. THOMAS, Primary Examiner

U.S. Cl. X.R.

423—227, 232, 234, 243, 245, 514, 551

UNITED STATES PATENT OFFICE
CERTIFICATE OF CORRECTION

Patent No. 3,794,711                    Dated February 26, 1974

Inventor(s) S. P. BHATIA ET AL

It is certified that error appears in the above-identified patent and that said Letters Patent are hereby corrected as shown below:

<u>Column 1, line 6:</u>  Correct the spelling of the inventor's name from "Staya" to -- Satya --.

Signed and sealed this 17th day of September 1974.

(SEAL)
Attest:

McCOY M. GIBSON JR.
Attesting Officer

C. MARSHALL DANN
Commissioner of Patents